(12) United States Patent
Mohseni

(10) Patent No.: US 12,522,922 B2
(45) Date of Patent: Jan. 13, 2026

(54) COATING SYSTEM AND SUBSTRATE WITH COATING SYSTEM

(71) Applicant: RAYTHEON TECHNOLOGIES CORPORATION, Farmington, CT (US)

(72) Inventor: Hamidreza Mohseni, Avon, CT (US)

(73) Assignee: RTX Corporation, Farmington, CT (US)

( * ) Notice: Subject to any disclaimer, the term of this patent is extended or adjusted under 35 U.S.C. 154(b) by 163 days.

(21) Appl. No.: 18/209,098

(22) Filed: Jun. 13, 2023

(65) Prior Publication Data
US 2024/0417853 A1    Dec. 19, 2024

(51) Int. Cl.
| | |
|---|---|
| *F01D 25/24* | (2006.01) |
| *C23C 16/455* | (2006.01) |
| *C23C 28/04* | (2006.01) |
| *C25D 7/04* | (2006.01) |
| *F02C 7/00* | (2006.01) |

(52) U.S. Cl.
CPC ........ *C23C 16/45555* (2013.01); *C23C 28/04* (2013.01); *C25D 7/04* (2013.01); *F01D 25/24* (2013.01); *F02C 7/00* (2013.01); *F05D 2230/31* (2013.01); *F05D 2230/90* (2013.01); *F05D 2300/171* (2013.01); *F05D 2300/174* (2013.01); *F05D 2300/509* (2013.01); *F05D 2300/611* (2013.01)

(58) Field of Classification Search
CPC ...... F01D 25/24; F01D 25/246; F01D 11/005; F05D 2240/11
See application file for complete search history.

(56) References Cited

U.S. PATENT DOCUMENTS

| | | | |
|---|---|---|---|
| 10,100,656 B2* | 10/2018 | Bancheri | F16J 15/0887 |
| 10,683,766 B2* | 6/2020 | Lang | F01D 11/005 |
| 11,473,197 B2 | 10/2022 | Task | |
| 2017/0058686 A1* | 3/2017 | Bancheri | F16J 15/0887 |
| 2017/0130841 A1* | 5/2017 | Kantola | C23C 16/06 |
| 2020/0056483 A1 | 2/2020 | Joost et al. | |
| 2020/0056506 A1 | 2/2020 | Stoyanov et al. | |
| 2021/0025662 A1 | 1/2021 | Poteet et al. | |
| 2024/0173743 A1* | 5/2024 | Hazel | F01D 5/282 |

(Continued)

OTHER PUBLICATIONS

Mohsent, H., Scharf, T.W. (2012). Atomic layer deposition of ZnO/Al2O3/ZrO2 nanolaminates for improved thermal and wear resistance in carbon-carbon composites. Journal of Vacuum Science, American Institute of Physics. vol. 30, No. 1. Jan. 1, 2012. pp. 01A149-1-01A149-12.

(Continued)

*Primary Examiner* — Eldon T Brockman
(74) *Attorney, Agent, or Firm* — Carlson, Gaskey & Olds, P.C.

(57) ABSTRACT

A wear-reducing coating system for a substrate includes an innermost layer disposed on a substrate and an outermost layer disposed on the innermost layer. The innermost layer has higher load-carrying capacity than the outermost layer and the outermost layer has a lower coefficient of friction than the innermost layer. A method of applying a wear-reducing coating to a substrate and a method of applying a coating to a split ring casing for a high pressure compressor are also disclosed.

19 Claims, 2 Drawing Sheets

(56) References Cited

U.S. PATENT DOCUMENTS

2024/0175368 A1* 5/2024 Surace ................ F01D 11/003

OTHER PUBLICATIONS

Scharf, T.W., Prasad, S.V., Dugger, M.T., Kotula, P.G., Goeke, R.S. and Grubbs, R.K. (2006). Growth, structure and tribological behavior of atomic layer-deposited tungsten disulphide solid lubrication coatings with applications to MEMS. ACTA Materialia, vol. 54, No. 18. Oct. 1, 2006. pp. 4731-4743.
Partial European Search Report for EP Application No. 24179943.6 dated Jul. 16, 2024.
European Search Report for EP Application No. 24179943.6 dated Dec. 18, 2024.

* cited by examiner

COATING SYSTEM AND SUBSTRATE WITH COATING SYSTEM

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to casing structures within the gas turbine engine and in one example for the high pressure compressor. These casing structures are subject to wear during operation of the gas turbine engine. Coatings can be used to protect the casing structures, however, the casing structure may include features such as slots with complex geometry and/or non-line-of-sight surface that pose a challenge for applying coatings.

SUMMARY

A wear-reducing coating system for a substrate according to an exemplary embodiment of this disclosure, among other possible things includes an innermost layer disposed on a substrate and an outermost layer disposed on the innermost layer. The innermost layer has higher load-carrying capacity than the outermost layer and the outermost layer has a lower coefficient of friction than the innermost layer.

In a further example of the foregoing, the wear-reducing coating system also includes at least one intermediate layer between the innermost layer and the outermost layer.

In a further example of any of the foregoing, the innermost layer is thicker than the outermost layer.

In a further example of any of the foregoing, the substrate is a titanium alloy.

In a further example of any of the foregoing, the substrate is a split ring casing of a high pressure compressor for a gas turbine engine.

In a further example of any of the foregoing, the substrate includes a slot, and the coating system is disposed in the slot.

In a further example of any of the foregoing, the slot is configured to receive a seal.

In a further example of any of the foregoing, the seal is a steel alloy.

A method of applying a wear-reducing coating to a substrate according to an exemplary embodiment of this disclosure, among other possible things includes depositing an innermost layer on a substrate and depositing an outermost layer on the innermost layer by atomic layer deposition. The innermost layer has a higher load-carrying capacity than the outermost layer and the outermost layer has a lower coefficient of friction than the innermost layer.

In a further example of the foregoing, the method also includes depositing at least one intermediate layer between the innermost layer and the outermost layer.

In a further example of any of the foregoing, the innermost layer is deposited by atomic layer deposition.

In a further example of any of the foregoing, the innermost layer is thicker than the outermost layer after the depositing.

In a further example of any of the foregoing, the innermost layer is deposited by electrodeposition or chemical vapor deposition.

In a further example of any of the foregoing, the substrate is a titanium alloy.

In a further example of any of the foregoing, the substrate is a split ring casing of a high pressure compressor for a gas turbine engine.

In a further example of any of the foregoing, the substrate includes a slot, and the depositing is in the slot.

In a further example of any of the foregoing, the slot is configured to receive a seal.

A method of applying a coating to a split ring casing for a high pressure compressor according to an exemplary embodiment of this disclosure, among other possible things includes depositing a coating onto a split ring casing for a high pressure compressor by atomic layer deposition. The split ring casing includes at least one slot configured to receive a seal. The coating is deposited in the slot.

In a further example of the foregoing, the coating includes an innermost layer and an outermost layer. The innermost layer has lower friction than the outermost layer and the outermost layer has higher hardness than the innermost layer.

In a further example of any of the foregoing, the split ring casing is a titanium alloy, and wherein the seal is a steel alloy.

DETAILED DESCRIPTION

Figure 1:
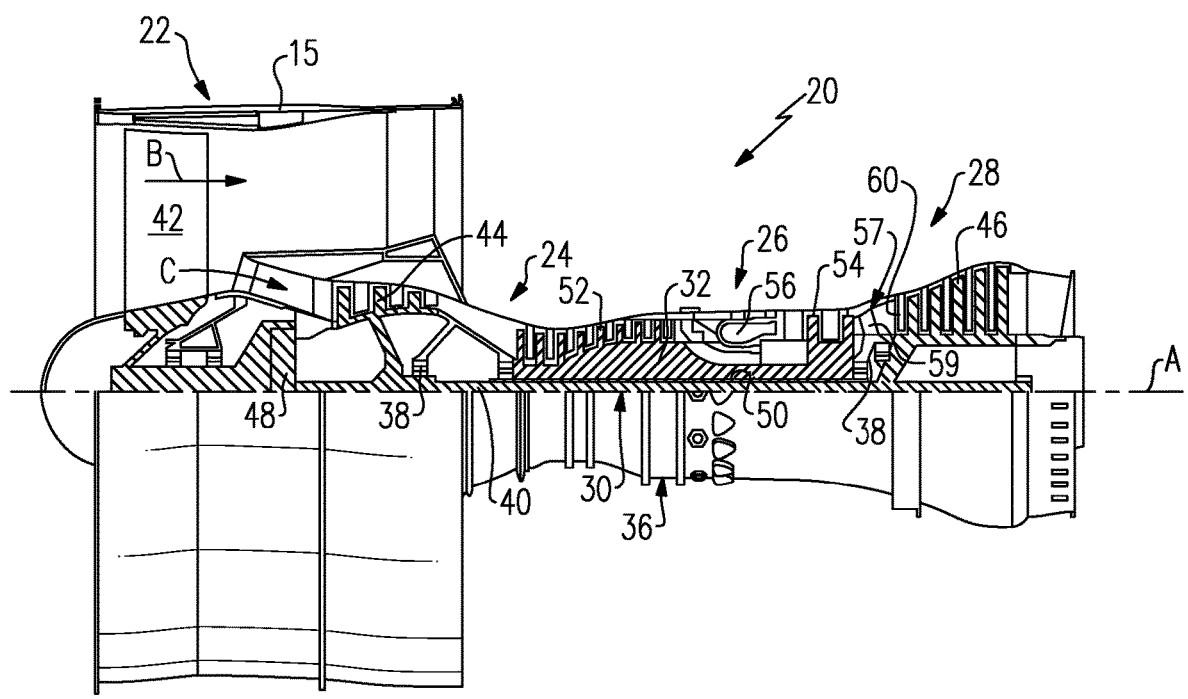
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/see divided by an industry standard temperature correction of [(Tram°R)/(518.7°R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Figure 2:
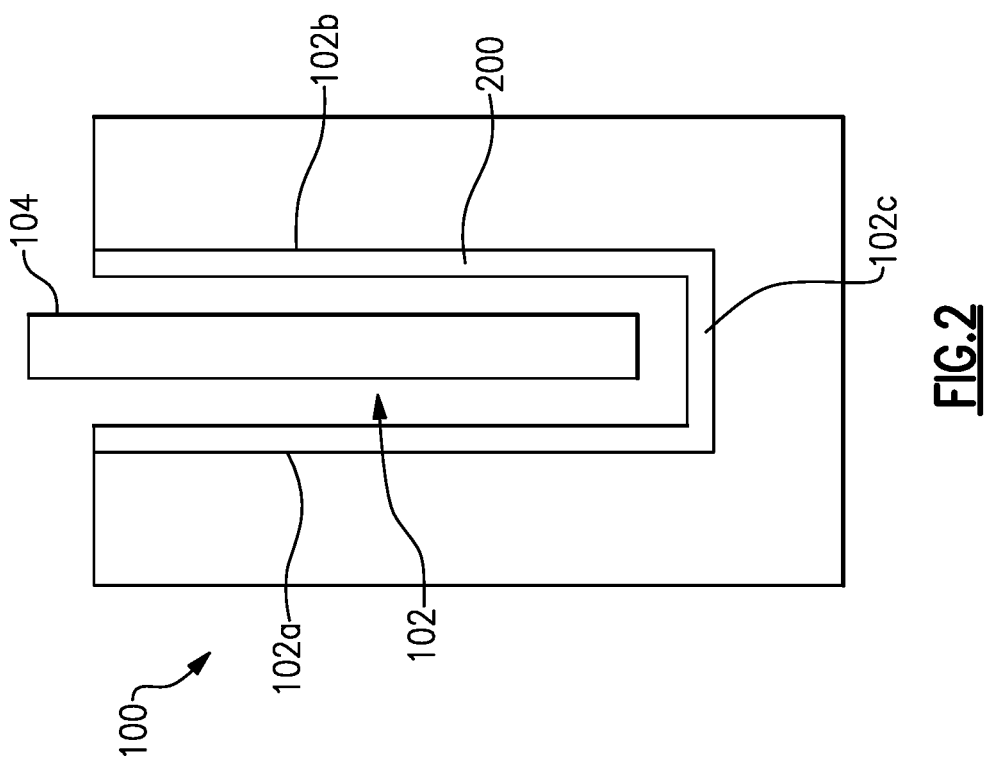
FIG. 2 schematically illustrates a detail view of a casing structure in the high pressure compressor of the engine in FIG. 1 with an example coating system.

The engine includes various casing structures including a split ring casing that surrounds the high pressure compressor 52. While it should be understood that the present description may be used for other structures in the gas turbine engine, the following description will be made with respect to a split ring casing 100 in the high pressure compressor 52. FIG. 2 shows a detail view of the split ring casing 100. This area of the split ring casing 100 includes a slot 102. The slot 102 is configured to receive a seal 104, which could be for example a blade outer air seal. The slot 102 has first and second opposed sides 102a/102b and an end wall 102c. In general the first and second opposed sides 102a/102b are at least several times longer than the end wall 102c, meaning the slot 102 has a relatively high aspect ratio.

In a particular example, the split ring casing 100 comprises a titanium alloy and the seal 104 comprises a steel alloy.

The split ring casing 100 experiences wear during operation of the engine 20. For instance the split ring casing 100 and in particular at the slot 102 can experience galling wear which can occur during assembly of the split ring casing 100 with other engine 20 components. The split ring casing 100 and in particular the slot 102 can also experience fretting wear due to friction at the interface with the seal 104. To protect the split ring casing 100, a coating system can be used. However, it is difficult to apply coatings to features like the slot 102, which include non-line-of-sight surfaces (first and second opposed sides 102a/102b and endwall 102c). Accordingly, applying a traditional coating by traditional methods poses certain challenges.

With continued reference to FIG. 2, the slot 102 includes a coating system 200. In this example, the coating system 200 comprises a single layer of a material applied to each of the first and second opposed sides 102a/102b and endwall 102c. The coating system 200 protects the slot 102 from wear, minimizes friction, and as a result enhances the reliability and lifetime of the split ring casing 100. The coating system 200 comprises a solid lubricant such as tungsten sulfide, molybdenum sulfide, zinc titanate, titanium nitride, and combinations thereof.

The coating system 200 is applied by atomic layer deposition (ALD). ALD is well known in the art and will not be described in detail herein, but in general includes growing thin films of material from gaseous reactants in a reaction chamber. The use of ALD allows for a number of benefits over other coating application methods, such as the ability to deposit uniform and smooth films of material with controlled thickness on line-of-sight and non-line-of-sight surfaces such as first and second opposed sides 102a/102b and endwall 102c of the slot 102. In addition, ALD can be performed at relatively lower temperatures than other coating application methods for non-line-of-sight surface such as chemical vapor deposition, making it suitable for a wider range of substrate materials with decreased concern of negative effects of high processing temperatures required for other deposition methods. The specific material of the coating system 200 is selected for compatibility with deposition by ALD.

In one example, areas of the split ring casing 100 that are not intended for application of the coating system 200 are masked prior to application of the coating system 200 by ALD. For instance, in one example the coating system 200 may be applied only within the slot 102, and other areas of the split ring casing 100 are masked.

Figure 3:
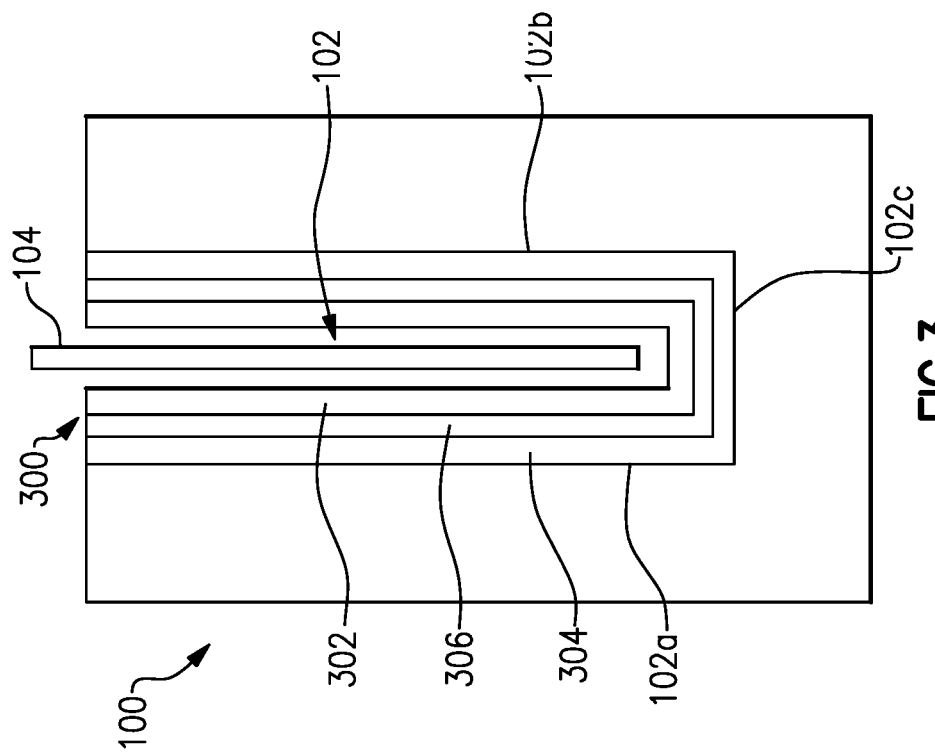
FIG. 3 schematically illustrates a detail view of a casing structure in the high pressure compressor of the engine in FIG. 1 with another example coating system.

FIG. 3 shows another example coating system 200. Like the coating system 200, the coating system 300 protects the slot 102 from wear, minimizes friction, and as a result enhances the reliability and lifetime of the split ring casing 100. To that end, the coating system 300 comprises a composite coating with multiple layers each imparting certain benefits to the split ring casing 100. In a particular example, the coating system 300 includes at least two layers, an outermost layer 302 and an innermost layer 304. In some examples one or more intermediate layers 306 could also be used. Any of the materials discussed above for the coating system 200 could be used for the layers 302/304/306.

In general the innermost layer 304 has the highest load-carrying capacity of the layers 302/304/306 and while the outermost layer 302 has the least shear resistance (or said another way, the lowest coefficient of friction) of the layers 302/304/306 and the entire coating system 300 (i.e., layers 302/304/306) decreases severe wear experienced by the split ring casing 100. "Load-carrying capacity" refers to characteristics of the material that give the material wear-resistance, which includes the hardness of the material. There are a number of well-known ways to quantify the hardness of a material, which will not be described in detail herein. In a particular example the hardness of the innermost layer 304 is measured by using nano-indentation techniques and reported based on the resistance of the innermost layer 304 to plastic deformation.

In a particular example, the coefficient of friction of the outermost layer 302 is below about 0.4.

In this way the coating system 300 can be tailored to maximize the wear-resistance/low-friction capabilities. For instance, a material that imparts high wear resistance but not necessarily low friction can be selected for the innermost layer 304 while a material that imparts low friction but not necessarily good wear resistance can be selected for the outermost layer 302.

The innermost layer 304 is the thickest of the layers 302/304/306 to maximize the benefits of high wear resistance, and in a particular example has a thickness on the order of nanometers.

In a particular example, the innermost layer 304 comprises at least one of TiN, TiC, TiB2, the intermediate layer 306 comprises at least one of zinc titanate, TiN, and TiN—$MoS_2$, and the outermost layer 302 comprises a diamond-like carbon (DLC) coating. The DLC coating may in some examples be doped with Ti.

At least one of the layers 302/304/306 and in particular at least the outermost layer 304 is applied by ALD like for the coating system 200 described above. The use of ALD to apply multilayer coatings is well known in the art and again will not be described herein detail.

ALD can require long processing times to achieve relatively thick layers. Accordingly, in some examples, other coating techniques suitable for non-line-of-sight surfaces, such as electroplating or chemical vapor deposition, could be used to apply at least the innermost layer 302, which as discussed above is the thickest layer. Still, ALD is used to deposit at least the outermost layer 304 to provide a smooth and uniform layer of controlled thickness, which is particularly important for the outermost layer 304 because it has relatively low shear resistance compared to the innermost layer 304. In this way, the benefits of ALD as discussed above are realized while reducing processing times by using another application method for the thick innermost layer 302. High uniformity and smoothness are not as critical for the innermost layer 302 because it primarily imparts wear resistance while the outermost layer 304 imparts low-friction as discussed above.

While the foregoing description is made with reference to the slot 102, it should be understood that other features of the split ring casing 100 that would traditionally pose challenges for coating application and are subject to wear could also benefit from the foregoing coating systems and methods.

As used herein, the terms "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A wear-reducing coating system for a substrate, comprising:
   an innermost layer disposed on a substrate;
   an outermost layer disposed on the innermost layer, wherein the innermost layer has higher load-carrying capacity than the outermost layer and the outermost layer has a lower coefficient of friction than the innermost layer; and
   wherein the substrate is a split ring casing of a high pressure compressor for a gas turbine engine.

2. The coating system of claim 1, further comprising at least one intermediate layer between the innermost layer and the outermost layer.

3. The coating system of claim 1, wherein the innermost layer is thicker than the outermost layer.

4. The coating system of claim 1, where in the substrate is a titanium alloy.

5. The coating system of claim 1, wherein the substrate includes a slot, and the coating system is disposed in the slot.

6. The coating system of claim 5, wherein the slot is configured to receive a seal.

7. The coating system of claim 6, wherein the seal is a steel alloy.

8. A method of applying a wear-reducing coating to a substrate, comprising:
  depositing an innermost layer on a substrate;
  depositing an outermost layer on the innermost layer by atomic layer deposition, wherein the innermost layer has a higher load-carrying capacity than the outermost layer and the outermost layer has a lower coefficient of friction than the innermost layer; and
  wherein the substrate is a split ring casing of a high pressure compressor for a gas turbine engine.

9. The method of claim 8, further comprising depositing at least one intermediate layer between the innermost layer and the outermost layer.

10. The method of claim 8, wherein the innermost layer is deposited by atomic layer deposition.

11. The method of claim 8, wherein the innermost layer is thicker than the outermost layer after the depositing.

12. The method of claim 11, wherein the innermost layer is deposited by electrodeposition or chemical vapor deposition.

13. The method of claim 8, where in the substrate is a titanium alloy.

14. The method of claim 8, wherein the substrate includes a slot, and the depositing is in the slot.

15. The method of claim 14, wherein the slot is configured to receive a seal.

16. A method of applying a coating to a split ring casing for a high pressure compressor, comprising:
  depositing a coating onto a split ring casing for a high pressure compressor by atomic layer deposition, the split ring casing including at least one slot configured to receive a seal, wherein the coating is deposited in the slot, the coating including a layer of a solid lubricant.

17. The method of claim 16, wherein the coating includes an outermost layer and an innermost layer, wherein the outermost layer has lower friction than the innermost layer and the innermost layer has higher hardness than the outermost layer, and the solid lubricant provides the outermost layer.

18. The method of claim 16, wherein the split ring casing is a titanium alloy, and wherein the seal is a steel alloy.

19. The method of claim 16, wherein the solid lubricant is one of tungsten sulfide, molybdenum sulfide, zinc titanate, titanium nitride, or combinations thereof.

* * * * *